Figure 1:
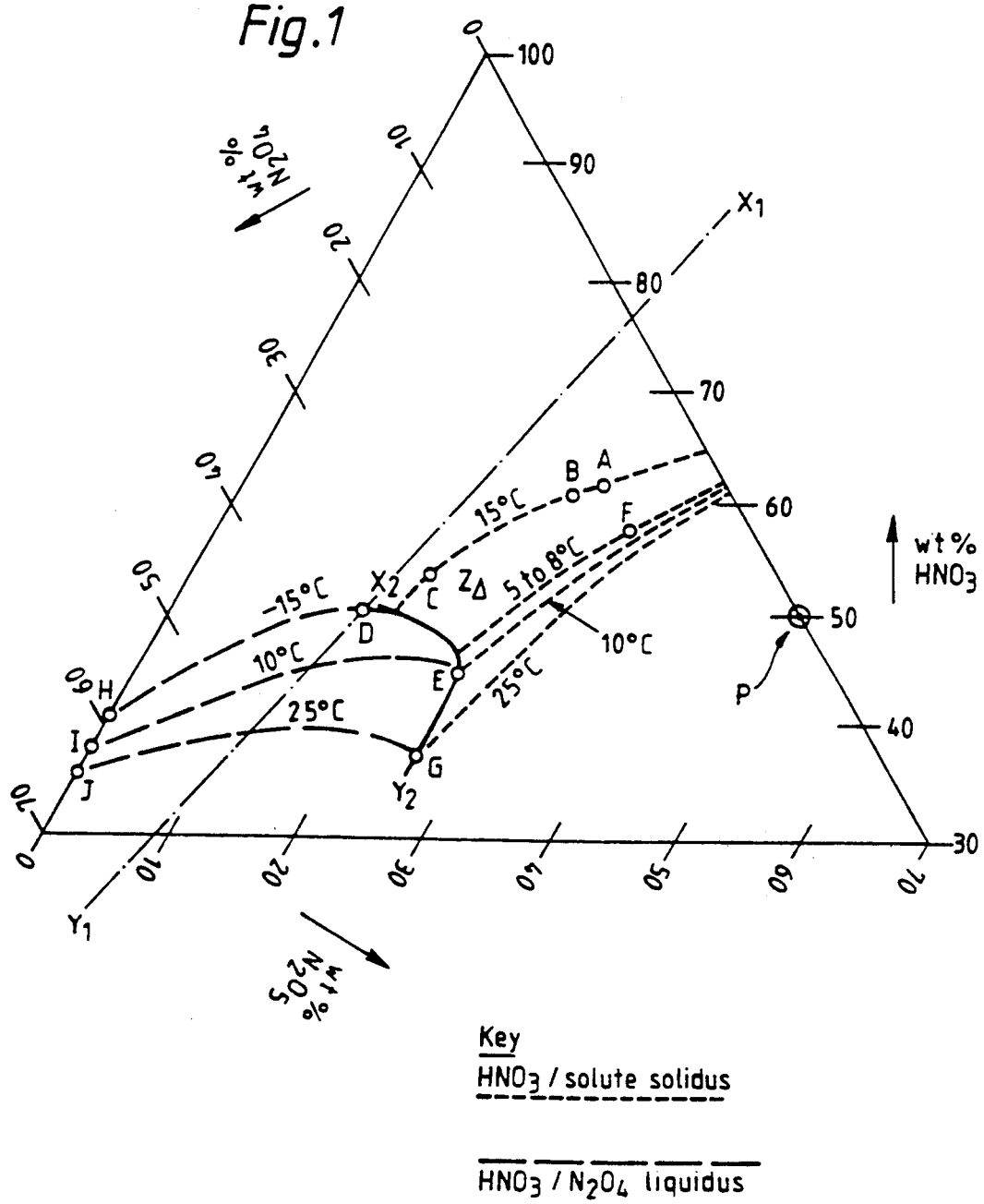

United States Patent [19]

Bagg et al.

[11] Patent Number: 5,128,001
[45] Date of Patent: Jul. 7, 1992

[54] METHOD OF SEPARATING ELECTROCHEMICALLY PRODUCED DINITROGEN PENTOXIDE FROM ITS SOLUTION IN NITRIC ACID

[75] Inventors: Greville E. G. Bagg, Waltham Abbey; David A. Salter, Salisbury; Andrew J. Sanderson, Snodland, all of England

[73] Assignee: The Secretary of State for Defence in Her Britannic Majesty's Government of the United Kingdom of Great Britain and Northern Ireland, London, England

[21] Appl. No.: 743,336
[22] PCT Filed: Nov. 20, 1990
[86] PCT No.: PCT/GB90/01784
§ 371 Date: Aug. 27, 1991
§ 102(e) Date: Aug. 27, 1991
[87] PCT Pub. No.: WO91/07524
PCT Pub. Date: May 30, 1991

[30] Foreign Application Priority Data

Nov. 20, 1989 [GB] United Kingdom ............... 8926180

[51] Int. Cl.⁵ ............................................. C25B 1/00
[52] U.S. Cl. ...................................... 204/101; 204/103; 423/400
[58] Field of Search ............... 204/101, 103; 423/400

[56] References Cited

U.S. PATENT DOCUMENTS 4,432,902  2/1984  McGuire et al. ............... 204/59 R
4,443,308  4/1984  Coon et al. ........................ 204/103
4,525,252  6/1985  McGuire et al. ................. 204/101

FOREIGN PATENT DOCUMENTS 1089047  4/1984  U.S.S.R. .

Primary Examiner—John Niebling
Assistant Examiner—David G. Ryser
Attorney, Agent, or Firm—Nixon & Vanderhye

[57] ABSTRACT

A method of separating $N_2O_5$ from its solution in nitric acid which comprises the steps of: (a) preparing, by the electrochemical oxidation of $N_2O_4$ in nitric acid, a nitric acid solution at a temperature of at least 10° C. containing at least 45 wt. % of dissolved ($N_2O_4 + N_2O_5$) and having a dissolved $N_2O_5$:nitric acid ratio by weight of at least 1:3, and (b) cooling the acid solution to less than 8° C. until an $N_2O_5$ solvate precipitates from solution. The main advantage of the invention is that it enables electrically-efficient electrochemical methods to be employed in the production of the acid solution from which the solute is recovered.

14 Claims, 2 Drawing Sheets

METHOD OF SEPARATING ELECTROCHEMICALLY PRODUCED DINITROGEN PENTOXIDE FROM ITS SOLUTION IN NITRIC ACID

This invention relates to a method of separating dinitrogen pentoxide ($N_2O_5$) from its solution in nitric acid.

It is well known that dinitrogen pentoxide ($N_2O_5$) can be prepared at relatively low cost by the electrochemical oxidation of dinitrogen tetroxide ($N_2O_4$) dissolved in concentrated nitric acid. Typically, the solution of $N_2O_4$ in nitric acid is situated in the anode compartment of an electrochemical cell with a second solution of $N_2O_4$ in nitric acid present in the cathode compartment. An acid-resistance ion-exchange membrane separates the two compartments. When current is passed through the cell, $N_2O_5$ is formed in the anode compartment and water in the cathode compartment.

It is also known from published USSR Inventor's Certificate SU-1089047A that solid $N_2O_5$ can be separated from strong, 35–40 wt % solutions of $N_2O_5$ in nitric acid produced electrochemically, by the subsequent addition to the solution of moderate amounts of liquid $N_2O_4$ at a temperature of $-5°$ C. to $0°$ C. A 1:1 by weight solvate of $N_2O_5$ with nitric acid precipitates from the solution, from which pure $N_2O_5$ can be recovered by low pressure sublimation.

One of the disadvantages of this method of $N_2O_5$ separation is that it requires a starting solution of $N_2O_5$ in nitric acid which is inefficient and costly to produce electrochemically. SU-1089047A teaches that at the temperature (typically $10°$ C. to $15°$ C.) of electrochemical preparation of the 35–40 wt % $N_2O_5$ starting solution, the total ($N_2O_4 + N_2O_5$) concentration in the solution must not exceed 38–40 wt % in order to suppress the unwanted formation of precipitate in the electrochemical cell itself. By simply subtraction, it can be seen that the solution from which the $N_2O_5$ is to be separated must contain less than 5 wt % $N_2O_4$. However, in practice the electrical efficiency of electrochemical $N_2O_5$ production decreases sharply with increasing $N_2O_5$ concentration and decreasing $N_2O_4$ concentration (especially at $N_2O_4$ concentrations at or below 5 wt %) in the anolyte. This is due in part to leakage of $N_2O_4$ and water through the cell membrane from the catholyte to the anolyte and also in part to the reduced electrical conductivity of the anolyte at low $N_2O_4$ concentrations which decreases electrical efficiency. Such leakage can (in the case of $N_2O_4$ leakage) be suppressed by employing a low $N_2O_4$ concentration in the catholyte, but this reduces catholyte conductivity. Water leakage can be reduced but at the expense of removing it at frequent intervals from the catholyte in order to keep its concentration low.

It has now been discovered that provided the anolyte is maintained at a temperature of at least $10°$ C., the anolyte can contain a much higher dissolved nitrogen oxide content than has hitherto been realised so enabling more efficient electrochemical methods of $N_2O_5$ generation to be utilised by virtue of the anolytes' higher $N_2O_4$ content.

Accordingly, the present invention provides a method of separating $N_2O_5$ from its solution in nitric acid which comprises the steps of:

(a) preparing, by the electrochemical oxidation of $N_2O_4$ in nitric acid, a nitric acid solution at a temperature of at least $10°$ C. containing at least 45 wt % of dissolved ($N_2O_4 + N_2O_5$) and having a dissolved $N_2O_5$:nitric acid ratio by weight of at least 1:3.

(b) cooling the acid solution to less than $8°$ C. until an $N_2O_5$ solvate precipitates from solution.

The method preferably further comprises the subsequent step of (c) recovering the $N_2O_5$ solvate from the acid solution, most preferably by filtration.

In order to enhance the yield of solid precipitated, the acid solution prepared in step (a) preferably contains at least 50 wt % of dissolved ($N_2O_4 + N_2O_5$). A maximum dissolved ($N_2O_4 + N_2O_5$) concentration of up to about 60 wt % in step (a) is achievable without the formation of a separate liquid $N_2O_4$ phase. In practice, a maximum ($N_2O_4 + N_2O_5$) concentration in solution of about 55 wt % is recommended.

In order to ensure that premature precipitation of $N_2O_5$ is prevented during the electrochemical oxidation of $N_2O_4$, the solution is preferably prepared in step (a) at a temperature of at least $12°$ C. more preferably at a temperature of from $15°$ C. to $30°$ C. and most preferably at a temperature of from $20°$ C. to $25°$ C. The solubility of $N_2O_5$ advantageously increases with temperature especially at high $N_2O_4$ concentrations in solution, although above about $25°$ C. thermal decomposition of $N_2O_5$ can become a problem.

At precipitation temperatures at or above about $5°$ C., the concentration of both $N_2O_5$ and $N_2O_4$ in the acid must approach saturation in order to produce any $N_2O_5$ precipitation and even then the yield of precipitate tends to be very low. The minimum precipitation temperature is preferably at least $-25°$ C., more preferably at least $-20°$ C., most preferably at least $-15°$ C. Although the amount of $N_2O_5$-rich solute increases with decreasing precipitation temperature, the cost of cooling the solution also increases and at temperature below $-15°$ C., contamination of the precipitate with solid $N_2O_4$ becomes an increasing problem. For these reasons, the precipitation temperature is most preferably within the range $-15°$ C. to $0°$ C.

The acid solution is preferably cooled to below $-5°$ C., more preferably below $-10°$ C., especially where the solution contains at least 50 wt % ($N_2O_4 + N_2O_5$). This is because the combined effect of cooling and solvate precipitation on such solutions is a tendency for the $N_2O_4$ to reach its saturation limit and form a separate liquid phase into which the $N_2O_5$ will migrate so reducing solute yield. However, at temperature below about $0°$ to $-5°$ C., it has been found that the reduction in $N_2O_4$ solubility with decreasing temperature during solvate precipitation becomes much less pronounced and may even increase slightly, whereas the corresponding reduction in $N_2O_5$ solubility with decreasing temperature tends to become more pronounced. Therefore, the amount of phase-separated $N_2O_4$ produced with decreasing acid temperature remains relatively small, and this factor, together with the steadily decreasing solubility of $N_2O_5$ in $N_2O_4$ with decreasing temperature, minimises $N_2O_5$ losses into that $N_2O_4$ phase.

The amount of $N_2O_5$ precipitated also advantageously increases with increasing $N_2O_5$ concentration in the solution prepared in step (a). It has been discovered that the acid solution prepared in step (a) may contain an approximate $N_2O_5$:nitric acid ratio by weight of up to at least 1:1.8 at temperatures at or above $10°$ C. without the formation of an $N_2O_5$ precipitate in solution. The overall upper limit for dissolved $N_2O_5$ concentration in solution is about 40 parts of weight of $N_2O_5$ to 60 parts by weight of nitric acid, preferably 35 parts by weight of $N_2O_5$ per 65 parts by weight of nitric acid.

The minimum concentration of $N_2O_5$ which must be present in solution in order to effect its precipitation during step (b) is found to vary according to the temperature of and $N_2O_4$ concentration within the acid solution, and is generally found to increase with decreasing $N_2O_4$ concentration and increasing temperature. For example, at a solution temperature of $-15°$ C., the ratio by weight of $N_2O_5$ to nitric acid required to effect $N_2O_5$ precipitation must be at least about 1:3 even if the dissolved $N_2O_4$ concentration within the solution approaches saturation, whereas at a solution temperature of $+5°$ to $+8°$ C., the required minimum ratio rises considerably and must be greater than about 3:7. Since the amount of solid precipitated increases with increasing $N_2O_5$ concentration in solution, the ratio by weight of $N_2O_5$ to pure nitric acid in the solution prepared in step (a) is preferably at least 1:2.8 more preferably at least 3:7, in order to produce a reasonable yield of precipitate.

For any given precipitation temperature, the amount of $N_2O_5$ precipitated during step (b) generally increases with increasing concentration of dissolved $N_2O_4$ present in solution. For this reason, the solution prepared in step (a) preferably contains at least 15 wt %, more preferably at least 20 wt %, most preferably at least 25 wt %, of $N_2O_5$. The ratio by weight of $N_2O_4$ to nitric acid in the solution prepared in step (a) is preferably at least 1:4, more preferably at least 1:3. A high $N_2O_4$ concentration has the added advantage that during step (a) it increases the electrical conductivity of the anolyte and enables a higher $N_2O_4$ concentration to be used in the catholyte, and so improves the electrical efficiency of the electrochemical process for producing $N_2O_5$. The preferred maximum concentration of $N_2O_4$ in the acid solution produced in step (a) is a single phase saturated $N_2O_4$ solution, although $N_2O_4$ concentration is conveniently not greater than 30 wt % since cooling the solution with an $N_2O_4$ concentration at or below this level produces little or no separate liquid $N_2O_4$ into which appreciable amounts of $N_2O_5$ can migrate to reduce the yield of solute especially if a precipitation temperature of about $-5°$ C. or higher is used in step (b).

The present method preferably forms part of a process for the continuous or semi-continuous electrochemical generation of $N_2O_5$ in nitric acid, in which $N_2O_4$ in nitric acid is preferably recirculated through the anode compartment of an electrochemical cell. $N_2O_5$ solute is preferably recovered by the present method from at least part of the recirculated product stream from the anode compartment. Cooling of at least part of the acid solution stream to effect $N_2O_5$ solute precipitation at least partly removes the heat absorbed by the stream during anodic oxidation. Thereafter, before the acid solution stream is returned to the cell to effect further $N_2O_5$ generation therein, the precipitated $N_2O_5$ solute is preferably recovered from this stream, most preferably by filtration. Since the product stream must be recharged with $N_2O_4$ before being returned to the cell, then it is preferred that this step should be performed after recovery of the $N_2O_5$ solute previously precipitated by cooling.

In order to purify the $N_2O_5$ solute removed from the acid solution, it is conveniently washed with liquid $N_2O_4$ to remove nitric acid from its surface. Thereafter, it may be dried in a gas stream of, for example, air, $N_2$ or $O_2$, to drive off residual $N_2O_4$. The gas stream may contain small amounts of ozone to convert at least some of the remaining residual $N_2O_4$ to solid $N_2O_5$. Alternatively, in order to effect $N_2O_5$ purification the solute may be sublimed at a temperature of 5° C. to 10° C. and at a reduced pressure of 30-100 mm Hg, and the sublimed $N_2O_5$ vapour resolidified on a cold surface at about $-20°$ C. The solute so cleansed or the solid $N_2O_5$ so purified may then be dissolved in organic solvents for use as a nitrating agent in, for example, the process of converting hydroxyalkyloxetanes to nitratoalkyloxetanes as described in U.S. Pat. No. 3058994.

The present method may alternatively be used as a means of producing further solutions of $N_2O_5$ in nitric acid which are either more concentrated than and/or have lower $N_2O_4$ concentrations than the acid solution from which the $N_2O_5$ solute is initially recovered. In this case, the solute cleansing and purification steps described above are largely unnecessary. Instead, since the solute essentially consists of a mixture of $N_2O_5$ and nitric acid it may be dissolved in nitric acid to produce solutions of $N_2O_5$ in nitric acid to the required concentration which contain very little $N_2O_4$ in sharp contrast to the high levels of $N_2O_4$ to be found in the solution produced in step (a). Redissolving the solute in nitric acid is especially advantageous for producing nitric acid solutions containing more than 25 wt % $N_2O_5$ and/or less than 3% $N_2O_4$ since such solutions are difficult to produce efficiently and at relatively low cost by purely electrochemical means.

Mixtures of solute in nitric acid may also be prepared which contain $N_2O_5$ above its saturation limit in nitric acid. The resulting slurries provide more concentrated forms of $N_2O_5$ which are relatively stable and more easily stored and transported than solid solute.

Figure 2:
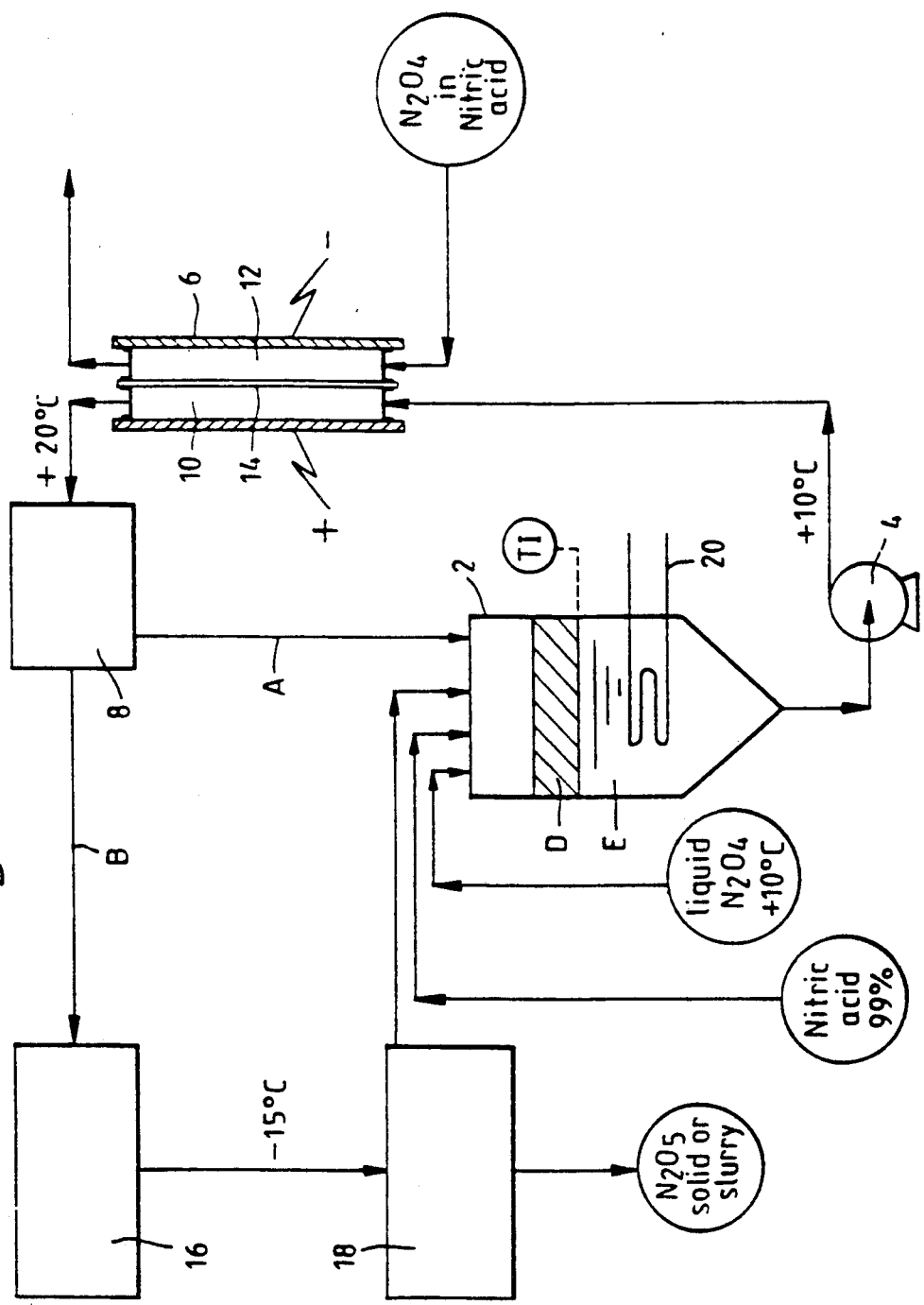

The present invention will now be described by way of example only with reference to the accompanying drawings in which FIG. 1 is an outline phase diagram of acid solution components illustrating the conditions under which $N_2O_5$ precipitation occurs; and FIG. 2 is a schematic process flow diagram of the method of the invention used in conjuction with a continuous process for the electrochemical generation of $N_2O_5$ in nitric acid.

A series of experiments were conducted to establish the phase diagram illustrated in FIG. 1.

Experiments 1 to 4

Four solutions of $N_2O_5$ in 100 g nitric acid were prepared at known $N_2O_5$ concentrations, and were cooled to $-15°$ C. In four separate experiments liquid $N_2O_4$ also at $-15°$ C. was slowly added with mixing to each of these solutions. The rate of addition was sufficiently slow to ensure complete dissolution of $N_2O_4$ into the acid solution, so preventing a build-up of a separate $N_2O_4$ phase before the $N_2O_4$ concentration in the acid had reached saturation.

$N_2O_4$ addition was continued until the formation of a white precipitate in solution was observed, and the amount of $N_2O_4$ added up to this point was recorded. Thereafter, $N_2O_4$ addition was continued further until the solution had virtually reached its saturation limit, the formation of further precipitate being observed during this time.

The precipitate was recovered by filtration on a Buchner funnel, washed with liquid $N_2O_4$ at $-15°$ C. to remove excess acid, and dried on the funnel in a stream of cold dry air. The recovered precipitate was identified by RAMAN spectroscopy as an $N_2O_5$/nitric acid solvate.

The amount of added $N_2O_4$ required to initiate precipitation of $N_2O_5$ was found to be dependent on the initial concentration of $N_2O_5$ in the acid solution. This can be seen from Table 1 below which summarises the result of each experiment at the point of initial precipitation.

TABLE 1

| Expt | Amount of $N_2O_5$ Present in 100 g Nitric Acid (g) | wt % $N_2O_5$ in Solution | Amount of $N_2O_4$ Added to Initiate $N_2O_5$ Precipitation (g) | wt % Composition of Acid Solution at Initial $N_2O_5$ Precipitation | | |
|---|---|---|---|---|---|---|
| | | | | $HNO_3$ | $N_2O_5$ | $N_2O_4$ |
| 1 | 46.2 | 31.6 | 15.8 | 61.73 | 28.52 | 9.75 |
| 2 | 43.1 | 30.12 | 21.1 | 60.90 | 26.25 | 12.85 |
| 3 | 35.4 | 26.14 | 51.1 | 53.62 | 18.98 | 27.40 |
| 4 | 29.1 | 23.07 | 68.7* | 50.8* | 14.6* | 34.6* |

*A second, liquid $N_2O_4$ phase began to appear at this point and the experiment was stopped. No $N_2O_5$ precipitation was observed.

A similar precipitation effect is observed by first adding liquid $N_2O_4$ and then cooling the solution to $-15°$ C. For example, by adding at least 15.8 g of $N_2O_4$ to the $N_2O_5$ solution used in Experiment 1, precipitation of $N_2O_5$ is observed at or before the solution has cooled to $-15°$ C.

Experiments 5 to 7

An almost saturated solution of $N_2O_5$ in nitric acid was obtained by dissolving solid $N_2O_5$ (11.5 g) in nitric acid (20.3 g) at 20° C. to produce a 36.2 wt % solution of $N_2O_5$ in nitric acid. The solution was cooled and liquid $N_2O_4$ slowly added with mixing to raise its concentration in solution in an attempt to precipitate $N_2O_5$ in a similar manner to that described in Experiments 1 to 4. The experiment was conducted three times over at different temperatures. The upper temperature limit and minimum addition of $N_2O_4$ necessary to initiate precipitation were noted. The results of these experiments are given in Table 2 below.

TABLE 2

| Expt | Temperature (°C.) | Amount of $N_2O_4$ Added to Initiate Precipitation (g) | Wt % Composition of Acid Solution at $N_2O_5$ Precipitation | | |
|---|---|---|---|---|---|
| | | | $HNO_3$ | $N_2O_5$ | $N_2O_4$ |
| 5 | 10 | *14.6 | *44.7 | *25.3 | *30.0 |
| 6 | 8 | 3.45 | 57.59 | 32.62 | 9.79 |
| 7 | 5 | 3.45 | 57.59 | 32.62 | 9.79 |

*A second, liquid $N_2O_4$ phase began to appear at this point and the experiment was stopped. No $N_2O_5$ precipitation was observed.

This series of three experiments shows that a solution temperature of 8° C. or less is required to effect $N_2O_5$ precipitation. At 10° C., no precipitate forms regardless of $N_2O_4$ concentration in solution.

Experiment 8

Solid $N_2O_5$ was added to a known weight of a 1:1 ratio by weight mixture of 100% nitric acid and $N_2O_4$ maintained at 25° C., until no more $N_2O_5$ would dissolve. It was observed that $N_2O_4$ started to form a separate liquid phase at the end of $N_2O_5$ addition.
Initial weight of $N_2O_4$/$HNO_3$ mixture: 11.7 g
Amount of $N_2O_4$ added: 4.1 g
The composition of a 1:1 $N_2O_4$/$HNO_3$ solution saturated with $N_2O_5$ is therefore:
37.0 wt % $HNO_3$
37.0 wt % $N_2O_4$
25.9 wt % $N_2O_5$

SUMMARY

The results of Experiments 1 to 8 are shown plotted on the phase diagram illustrated in FIG. 1.

Key to Table 1

A = Experiment No 1
B = Experiment No 2
C = Experiment No 3
D = Experiment No 4
E = Experiment No 5
F = Experiment Nos 6 and 7
G = Experiment No 8
H = Point estimated from published sources
I = Point estimated from published sources
J = Point estimated from published sources
Line $X_1Y_1$ = line of constant weight ratio of $HNO_3$:$N_2O_5$ for Experiment No 4.

It will be seen from the phase diagram of FIG. 1 that the broken curved line taken through points A, B, C, D and H represents the concentration of the three components $HNO_3$, $N_2O_4$ and $N_2O_5$ in the nitric solution at a constant temperature of $-15°$ C. Similar curves are also shown for nitric acid solutions at 5°–8° C., 10° C. and 25° C.

The solid line which passes through the cusps in each curve (line $X_2Y_2$) represents a boundary to the left of which the solution is saturated in $N_2O_4$.

The phase diagram may be used to determine the appropriate amount of $N_2O_5$ solute which will precipitate from any given singlephase acid solution of $N_2O_5$ and $N_2O_4$ in nitric acid. For example, if an acid solution of composition Z is cooled to $-15°$ C., the solution will lose both $N_2O_5$ and nitric acid and will assume a composition on the ABCDH curve. This composition will depend also upon the ratio of $N_2O_5$ to $HNO_3$ in the solute. If this solute composition is represented by point P (50% $N_2O_5$, 50% $HNO_3$), then the eventual composition of the acid solution will be approximately at the point of intersection between the straight line passing through points P and Z, and the curve passing through points A, B and C. By comparing the composition Z with the predicted composition of the solution after cooling, the amount of $N_2O_5$ which will precipitate from solution into the solute can be calculated.

EXAMPLE 1

FIG. 2 is a schematic process flow diagram illustrating the use of the present method in conjunction with a continuous process for the electrochemical production of $N_2O_5$ in nitric acid. The temperatures shown are typical of those which may be employed.

The $N_2O_5$ production process outlined in FIG. 2 employs a temperature-controlled reservoir 2, a recirculation pump 4, an electrochemical cell 6, and a flow divider 8 all connected together in a production loop to allow at least partial recirculation of the product acid. For any given rate of $N_2O_5$ production, recirculation increases the turbulent regime hence conductivity of the cell and reduces the concentration gradient of solution components through the cell. The cell 6 has an anode compartment 10, a cathode compartment 12, and an ion exchange membrane 14 separating the two compartments. The membrane 14 is preferably an anionic or semi-permeable (non-ionic) membrane.

A solution of $N_2O_4$ and $N_2O_5$ in nitric acid at 10° C. is fed continuously by the pump 4 from the reservoir 2 through the anode compartment 10 where some of the $N_2O_4$ is electrochemically oxidised to $N_2O_5$. The solution pumped from the reservoir 2 is saturated with $N_2O_4$ and contains $N_2O_5$ in the weight ratio of $N_2O_5$:nitric acid of about 1:3. At the same time, a nitric acid solution containing 20 wt % $N_2O_4$ and 8 wt % water is fed continuously through the cathode compartment 12. Electrical current is passed through the cell 6 at 4.5 volts and a current density of 0.15-0.2 amps $cm^{-2}$, and the flow rate of anolyte adjusted such that the $N_2O_5$ content of the acid solution leaving the anode compartment 10 is increased to an $N_2O_5$—to—$HNO_3$ ratio of about 8:17 by weight.

The electrochemical reactions within the cell 6 cause the temperature of the acid solutions within the anode and cathode compartments 10 and 12 to increase. The heated product acid solution from the anode compartment 10, which at this point has a temperature of typically 15°-25° C., is then fed to the flow divider 8 which divides the acid solution into two streams (A) and (B).

Stream (A) is recycled directly to the reservoir 2. Stream (B) is recycled to the reservoir 2 through a chiller/crystalliser 16 and a solids separator 18. The chiller/crystalliser 16 cools the stream (B) to a temperature (typically $-15°$ C.) at which a proportion of the $N_2O_5$ dissolved in solution is caused to precipitate out as an $N_2O_5$ solute, and a proportion of the $N_2O_4$ dissolved in solution is cause to form a separate liquid phase. The solute is recovered from the stream (B) in the solids separator 18 which may comprise, for example, a filter or a hydrocyclone. The cold, $N_2O_5$—depleted stream (B) is then returned to the reservoir 2 where its entrained liquid $N_2O_4$ phase rapidly redissolves in the acid solution due to the warmer conditions which prevail there.

Nitric acid and liquid $N_2O_4$ are added to the reservoir 2 to make up for process losses. The relative flow rates of streams (A) and (B) and the actual temperature of precipitation are adjusted to return the $N_2O_5$—to—nitric acid ratio in the reservoir to 1:3 so that the whole process exists in a state of equilibrium. The rate of $N_2O_4$ addition is sufficiently high to form a separate, liquid $N_2O_4$ layer (D) in the reservoir above the acid layer (E). This ensures that at the controlled temperature within the reservoir (2) of typically 10° C., the acid layer is effectively saturated with dissolved $N_2O_4$ which promotes both high rates of $N_2O_5$ production in the cell 2 at which current efficiencies, and high rates of $N_2O_5$ precipitation in the chiller/crystalliser 16. A heating-/cooling coil 20 is used to control the temperature of the reservoir 2. The addition of fresh nitric acid to the reservoir 2, and the use of an operating temperature in the reservoir which is generally much higher than that of the solids separator 18, help to ensure that any $N_2O_5$ precipitate carried over from the separator is rapidly redissolved in the reservoir before the acid solution is pumped back to the cell 6.

EXAMPLE 2

The method and method conditions of Example 1 were repeated except that the acid solution was passed in series through three electrochemical cells 10 with their anode compartments 16 connected in series. In order to suppress the formation of a separate $N_2O_4$ phase during cooling/precipitation, the concentration of $N_2O_4$ in the acid solution within the reservoir was maintained at about 30 wt % by carefully controlling its rate of addition. At 10° C., the acid solution within the resevoir was not therefore saturated with $N_2O_4$ and a separate $N_2O_4$ layer did not form. The flow rate through the cells 10 was adjusted to produce an acid solution leaving the last anode compartment having a $N_2O_5$—to—$HNO_3$ ratio of about 3:5 at about 25° C., which is appropriately at the saturation limit of $N_2O_5$ in solutions of nitric acid and $N_2O_4$ at that temperature.

EXAMPLE 3

The wet solvate product from Example 1 was washed at 5° C. with a portion of the $N_2O_4$ layer taken from the reservoir 20 to remove nitric acid from the surface of the solvate crystals. The $N_2O_4$ was then returned to the reservoir to prevent loss of $N_2O_5$ from the system. The washed solvate was then dried in a stream of dry ozonised air at 10° C., and dissolved in dichloromethane in the proportion of 10 g dried solvate to 90 g dichloromethane.

EXAMPLE 4

The wet solvate product of Example 1 or Example 2 was washed with a small amount of 99% nitric acid at 0° C. to remove its surface contamination of residual $N_2O_4$-rich nitric acid resulting from the solvates method of preparation. System losses were minimised by feeding the spent nitric acid washings to the reservoir 2. The washed solvate was then added to 99% nitric acid in the ratio of 35 parts by weight of solvate to 65 parts by weight of nitric acid to produce a clear concentrated solution of $N_2O_5$ in nitric acid containing low levels of $N_2O_4$.

EXAMPLE 5

The method of Example 4 was repeated except that the washed solvate was added to 99% nitric acid in the ratio of 85 parts by weight of solvate to 15 parts by weight of nitric acid, to produce a slurry of $N_2O_5$ in nitric acid.

EXAMPLES 6 and 7

The methods of Examples 4 and 5 were repeated except that the nitric acid washing steps were omitted, resulting in products containing slightly higher levels of $N_2O_4$.

What is claimed is:

1. A method of separating $N_2O_5$ from its solution in nitric acid characterised by the steps of
    (a) preparing, by the electrochemical oxidation of $N_2O_4$ in nitric acid, a nitric acid solution at a temperature of at least 10° C. containing at least 45 wt % of dissolved ($N_2O_4 + N_2O_5$) and having a dissolved $N_2O_5$:nitric acid ratio by weight of at least 1:3, and (b) cooling the acid solution to less than 8° C. until an $N_2O_5$ solvate precipitates from solution.

2. A method according to claim 1 characterised in that the acid solution in step (a) contains at least 50 wt % of dissolved ($N_2O_4 + N_2O_5$).

3. A method according to claim 2 characterised in that the acid solution is cooled in step (b) to a temperature of less than $-5°$ C.

4. A method according to claim 1 characterised in that the ratio by weight of $N_2O_4$ to nitric acid in the acid solution prepared in step (a) is from 1:4 to saturation.

5. A method according to claim 1 characterised in that the acid solution prepared in step (a) contains at least 15 wt % $N_2O_4$.

6. A method according to claim 1 characterised in that the nitric acid solution is cooled in step (b) to a temperature of from $-25°$ C. to $0°$ C.

7. A method according to claim 1 characterised by the subsequent step of (c) recovering the $N_2O_5$ solvate from the acid solution.

8. A method according to claim 7 characterised in that the acid solution comprises a product stream taken continuously from the anode compartment of an electrochemical cell employed for said electrochemical oxidation.

9. A method according to claim 8 characterised in that at least part of the $N_2O_5$-depleted product stream from step (c) is recirculated back through the anode compartment of the cell.

10. A method according to claim 9 characterised in that part of the recirculated product stream bypasses steps (b) and (c).

11. A method according to claim 9 characterised in that $N_2O_4$ is added to the product stream after step (c) but before the steam re-enters the anode compartment of the cell.

12. A method according to claim 11 characterised in that the $N_2O_4$ is added to the product stream in a reservoir containing the product acid as a first liquid phase and $N_2O_4$ as a second liquid phase.

13. A method according to claim 7 characterised in that after step (c), the recovered $N_2O_5$ solvate is at least partly dissolved in an organic solvent.

14. A method according to claim 7 characterised in that after step (c), the recovered $N_2O_5$ solvate is at least partly dissolved in nitric acid.

* * * * *